US009489309B2

(12) United States Patent
Koka et al.

(10) Patent No.: US 9,489,309 B2
(45) Date of Patent: Nov. 8, 2016

(54) METHOD AND SYSTEM FOR DYNAMIC CACHE PARTITIONING USING ADDRESS REMAPPING

(71) Applicant: Oracle International Corporation, Redwood Shores, CA (US)

(72) Inventors: Pranay Koka, Austin, TX (US); Herbert Dewitt Schwetman, Jr., Austin, TX (US); Mohammad Zulfiqar, Austin, TX (US); Jeff Diamond, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 200 days.

(21) Appl. No.: 14/530,118

(22) Filed: Oct. 31, 2014

(65) Prior Publication Data

US 2016/0124858 A1    May 5, 2016

(51) Int. Cl.
*G06F 12/12*    (2016.01)
*G06F 12/08*    (2016.01)
*G06F 12/02*    (2006.01)
*G06F 12/10*    (2016.01)

(52) U.S. Cl.
CPC ....... *G06F 12/0864* (2013.01); *G06F 12/0891* (2013.01); *G06F 12/12* (2013.01); *G06F 12/0207* (2013.01); *G06F 12/0292* (2013.01); *G06F 12/0868* (2013.01); *G06F 12/0873* (2013.01); *G06F 12/1009* (2013.01); *G06F 12/1063* (2013.01); *G06F 12/123* (2013.01); *G06F 2212/1021* (2013.01); *G06F 2212/604* (2013.01)

(58) Field of Classification Search
CPC .......... G06F 12/0207; G06F 12/0292; G06F 12/0868; G06F 12/0873; G06F 12/1009; G06F 12/1063; G06F 12/123; G06F 12/12; G06F 2212/1021; G06F 2212/604

USPC .......... 711/128, 129, 141, 145, 203, 207; 710/18, 23, 40, 56, 120; 712/225, 248
See application file for complete search history.

(56) References Cited

U.S. PATENT DOCUMENTS

| | | | | |
|---|---|---|---|---|
| 5,864,852 A | * | 1/1999 | Luotonen | G06F 17/30902 707/999.009 |
| 6,075,938 A | * | 6/2000 | Bugnion | G06F 9/544 703/27 |
| 6,282,625 B1 | * | 8/2001 | Porterfield | G06F 12/1081 345/568 |
| 7,900,017 B2 | * | 3/2011 | Hall | G06F 12/1036 711/207 |
| 7,991,956 B2 | * | 8/2011 | Illikkal | G06F 11/3409 711/118 |

(Continued)

*Primary Examiner* — Reba I Elmore
(74) *Attorney, Agent, or Firm* — Osha Liang LLP (57) ABSTRACT

A system and method for providing a cache virtual partition to a data structure that includes receiving, at an address remapping device, a cache-check request including a memory address including bits, identifying, using a virtual partition table, the virtual partition by determining that the memory address falls within a data structure memory address range, obtaining a copy of virtual partition bits which include a portion of the bits, appending the copy of the virtual partition bits to the memory address, rewriting the virtual partition bits to obtain rewritten virtual partition bits corresponding to the virtual partition, and generating a remapped memory address by replacing the virtual partition bits with the rewritten virtual partition bits. The remapped memory address includes the copy of the virtual partition bits and rewritten virtual partition bits. The method also includes transmitting a remapped cache check request including the remapped memory address to the cache.

20 Claims, 7 Drawing Sheets

(56) References Cited

U.S. PATENT DOCUMENTS

| | | | | |
|---|---|---|---|---|
| 2001/0028355 | A1* | 10/2001 | Porterfield | G06F 12/1081 345/568 |
| 2006/0004942 | A1* | 1/2006 | Hetherington | G06F 9/3802 711/3 |
| 2006/0075147 | A1* | 4/2006 | Schoinas | G06F 12/1027 710/3 |
| 2007/0005897 | A1* | 1/2007 | Bink | G11C 29/76 711/128 |
| 2009/0172295 | A1* | 7/2009 | Steiner | G06F 12/0817 711/141 |
| 2014/0181388 | A1* | 6/2014 | Mohandru | G11C 7/1072 711/105 |
| 2015/0113230 | A1* | 4/2015 | Cheng | G06F 12/0824 711/145 |
| 2015/0149742 | A1* | 5/2015 | Richter | G06F 12/1009 711/206 |
| 2016/0077758 | A1* | 3/2016 | Carter | G06F 3/0623 711/3 |
| 2016/0147623 | A1* | 5/2016 | Ping | G06F 11/2092 714/6.13 |

* cited by examiner

| Data Data Structure | Address Range Start | Data Structure Size (bytes) | Virtual Partition Start-Block Value | Virtual Partition Size | Virtual Partition Mask |
|---|---|---|---|---|---|
| Data Structure 1 | 0x16EFB109 | 38,820 | 0 | 1 | 000 |
| Data Structure 2 | 0x00FFEA63 | 12,500 | 0 | 1 | 000 |
| Data Structure 3 | 0x22A13508 | 4,096,000 | 1 | 4 | 011 |
| Data Structure 4 | 0x00319684 | 220,417 | 5 | 2 | 001 |
| Data Structure 5 | 0x006A0000 | 1,024,000 | 5 | 2 | 001 |
| Default Virtual Partition | N/A | N/A | 7 | 1 | 000 |

METHOD AND SYSTEM FOR DYNAMIC CACHE PARTITIONING USING ADDRESS REMAPPING

BACKGROUND

Modern computer processors often have associated cache memory. Cache memory may operate at higher speeds than various other types of memory (e.g., main system memory which may be random access memory (RAM)) available in a computing device, and therefore data stored in a cache associated with a given computer processor may be available for use by the computer processor more quickly than data that must be retrieved from other memory locations and/or hard drives. Additionally, situations occur with regard to modern computing devices in which a data structure residing, for example, in main system memory is of particular importance and/or relevance to computations being performed by a processor of a computing device. In such situations, execution speed of a computer processor may increase if the main system memory addresses in which the data structure is stored are associated with a designated portion of a cache.

SUMMARY

In general, in one aspect, the invention relates to a method for providing a virtual partition of a cache to a data structure that includes receiving, at an address remapping device, a cache check request that includes a memory address including a plurality of bits, identifying, using a virtual partition table, the virtual partition by determining that the memory address falls within a data structure memory address range of a plurality of data structure memory address ranges, obtaining a copy of a plurality of virtual partition bits including a portion of the plurality of bits, appending the copy of the plurality of virtual partition bits to the memory address, rewriting the plurality of virtual partition bits to obtain a plurality of rewritten virtual partition bits corresponding to the virtual partition, and generating a remapped memory address by replacing the plurality of virtual partition bits with the plurality of rewritten virtual partition bits. The remapped memory address includes the copy of the plurality of virtual partition bits and the plurality of rewritten virtual partition bits. The method also includes transmitting a remapped cache check request comprising the remapped memory address to the cache.

In general, in one aspect, the invention relates to a system for providing a virtual partition of a cache to a data structure that includes a computer processor, the cache associated with the computer processor, and an address remapping device. The address remapping device includes functionality to receive a cache check request comprising a memory address comprising a plurality of bits, identify, using a virtual partition table, the virtual partition by determining that the memory address falls within a data structure memory address range of a plurality of data structure memory address ranges, obtain a copy of a plurality of virtual partition bits comprising a portion of the plurality of bits, append the copy of the plurality of virtual partition bits to the memory address, rewrite the plurality of virtual partition bits to obtain a plurality of rewritten virtual partition bits corresponding to the virtual partition, and generate a remapped memory address by replacing the plurality of virtual partition bits with the plurality of rewritten virtual partition bits. The remapped memory address comprises the copy of the plurality of virtual partition bits and the plurality of rewritten virtual partition bits. The address remapping device also includes functionality to transmit a remapped cache check request comprising the remapped memory address to the cache. The system also includes an address reconstruction device. The address reconstruction device includes functionality to receive an evicted cache line that includes the remapped memory address, determine that the evicted cache line is a dirty cache line, obtain, based on the determination, the plurality of virtual partition bits that were appended to the memory address, replace the plurality of rewritten virtual partition bits of the remapped memory address with the plurality of virtual partition bits to obtain a reconstructed memory address, and transmit a reconstructed evicted cache line towards a memory location identified by the reconstructed memory address.

In general, in one aspect, the invention relates to a non-transitory computer readable medium that includes instructions for providing a virtual partition of a cache to a data structure which, when executed, cause a computer processor to receive, at an address remapping device, a cache check request that includes a memory address comprising a plurality of bits, identify, using a virtual partition table, the virtual partition by determining that the memory address falls within a data structure memory address range of a plurality of data structure memory address ranges, obtain a copy of a plurality of virtual partition bits comprising a portion of the plurality of bits, append the copy of the plurality of virtual partition bits to the memory address, rewrite the plurality of virtual partition bits to obtain a plurality of rewritten virtual partition bits corresponding to the virtual partition, and generate a remapped memory address by replacing the plurality of virtual partition bits with the plurality of rewritten virtual partition bits. The remapped memory address comprises the copy of the plurality of virtual partition bits and the plurality of rewritten virtual partition bits. The non-transitory computer readable medium also includes instructions which cause the computer processor to transmit a remapped cache check request that includes the remapped memory address to the cache.

Other aspects of the invention will be apparent from the following description and the appended claims.

DETAILED DESCRIPTION

Specific embodiments of the invention will now be described in detail with reference to the accompanying figures. Like elements in the various figures may be denoted by like names and/or like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the inventions relate to a method and system for dividing a cache into virtual partitions which may be associated with one or more data structures used by one or more applications, programs, process, routines, etc. of a computing device. Specifically, in one or more embodiments of the invention, an address remapping device determines if a memory address associated with a cache check request falls within a memory address range associated with a virtual partition of a cache. More specifically, in one or more embodiments of the invention, if the memory address is determined to be within a memory range associated with a virtual partition, then the memory address is rewritten by appending a copy of a portion of memory address (e.g., a portion used to identify a location in the cache) to the memory address and then modifying the previously copied portion of the memory address. One or more embodiments of the invention also include an address reconstruction device which includes functionality to reconstruct the original memory address in the event that a dirty cache line is evicted from the cache.

Figure 1:
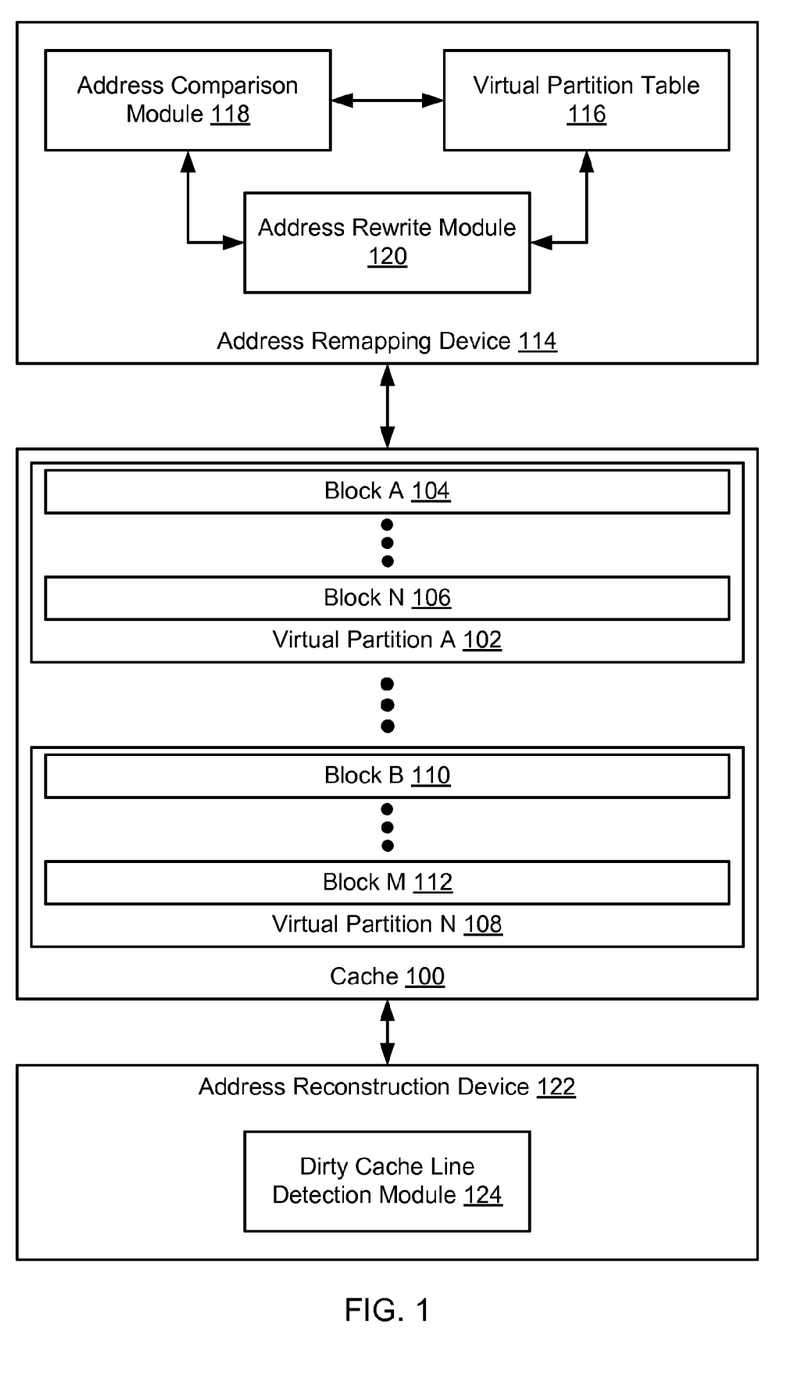
FIG. 1 shows a system in accordance with one or more embodiments of the invention.

FIG. 1 shows a system in accordance with one or more embodiments of the invention. As shown in FIG. 1, the system includes and address remapping device (114) and an address reconstruction device (122) operatively connected to a cache (100). The cache (100) may include one or more virtual partitions (e.g., virtual partition A (102), virtual partition N (108)), each of which may include one or more blocks (e.g., block A (104), block N (106), block B (110), block M (112)). The address remapping device (114) may include a virtual partition table (116), an address comparison module (118), and an address rewrite module (120). The address reconstruction device (122) may include a dirty cache line detection module (124). Each of these components is described below.

In one or more embodiments of the invention, a cache (100) is a physical construct for storing data (not shown). In one or more embodiments of the invention, the data may be any type of information and/or instruction relevant to any process, program, and/or application executing on any type of computing device (not shown). For example, the cache (100) may store instructions for a computer processor of a computing device to execute and/or information for the computer processor to use and/or manipulate.

In one or more embodiments of the invention, a computing device is any device and/or any set of devices capable of electronically processing instructions and that includes at least the minimum processing power, memory (e.g., random access memory (RAM)), input and output device(s), and/or cache memory in order to perform, at least in part, one or more embodiments of the invention. Examples of computing devices include, but are not limited to, servers (e.g., rack servers, blade-servers in a blade-server chassis, etc.), desktop computers, mobile devices (e.g., laptop computers, smart phones, personal digital assistants, e-readers, tablet computers, or other mobile devices), and/or any other type of computing device with the aforementioned minimum requirements.

In one or more embodiments of the invention, a cache (100) is associated with and/or operatively connected to one or more computer processors (not shown). For example, the cache (100) may be a level two cache that is operatively connected to a computer processor via a motherboard. As another example, the cache (100) may be included on the computer processor chip. In one or more embodiments of the invention, the cache (100) includes functionality to operate at higher speeds than other data storage locations accessible to the computer processor (e.g., RAM, hard drive, etc.) and may be physically closer to the computer processor.

In one or more embodiments of the invention, a cache (100) includes one or more cache lines (not shown) of any size consistent with one or more embodiments of the invention. For example, a cache line may be configured to hold thirty-two bytes, sixty-four bytes, one hundred and twenty-eight bytes, etc. of data. A cache line may be used to store contents of one or more units (e.g., bytes) of memory for use by a computer processor and may also include identifying information (e.g., tag bits) and one or more flag bits. In one or more embodiments of the invention, the number of cache lines in a cache (100) depends, at least in part, on the size of the cache and the size of the cache lines. For example, a thirty-two megabyte cache with one hundred and twenty-eight byte cache lines has around 262,144 cache lines (e.g., $32*(1024)^2/(128)$).

In one or more embodiments of the invention, the cache (100) is an N-way set associative cache. In such embodiments of the invention, the cache lines of the cache (100) may be divided in to two or more sets (not shown), with each set including an equivalent number of cache lines (i.e., the number of cache lines in a given set is the "N" in "N-way"). For example, a cache may be a four-way set associative cache, meaning that each set in the cache (100) includes four cache lines. In one or more embodiments of the invention, a set of the cache (100) is associated with at least a portion of the memory (not shown) in a computing device. For example, reads from and writes to the portion of memory associated with the set may occur, at least in part, via use of one or more cache lines of the set.

In one or more embodiments of the invention, the cache (100) is accessed (i.e., a cache check is performed) using at least part of a memory address in order to determine if the contents of the memory at the memory address are present in the cache (100). The memory address may be the address of a memory location whose contents a computer processor seeks to access (e.g., in order to perform a read operation or write operation) For example, when a computer processor with an N-way set associative cache seeks to perform functionality relating to a given memory address, the computer processor, before accessing the actual memory location, may check to determine if a copy of the contents of the location identified by the memory address exist in the cache (100). In such an example, a portion of the memory address sometimes called the set bits may determine which set of the cache the memory address is associated with. Further, a portion of the memory address sometimes called the tag bits may be used to determine if the contents of the memory address exist in any cache line within the set. Additionally, a portion of the memory address sometimes called the offset may be used to determine the location within a cache line that the relevant memory contents are located.

One of ordinary skill in the art and having the benefit of this disclosure will appreciate that the aforementioned cache example (i.e., an N-way set associative cache) is not representative of all possible cache accessing schemes, and that other schemes for using a cache may be encompassed by one or more embodiments of the invention. As an example of an additional cache access scheme, in a direct mapped cache a portion of the memory address which is sometimes called the line number is used to determine which cache line in a cache is associated with the memory address, and other portions of the memory address (e.g., tag bits, offset) are used to determine if the contents of the relevant memory address are in the cache line and at what offset. For another example, in a fully associative cache, any memory address may be associated with any cache line of the cache. In such an example, a portion of a memory address whose contents are requested by a computer processor are used as a tag, which is compared with a tag associated with each cache line of a cache to determine if the contents of the memory address are in the cache. Another portion of the memory address may be used as the offset within a given cache line of the memory content. One or more embodiments of this invention may function with N-way set associative caches, direct mapped caches, fully associative caches, any combination thereof, or any other cache access scheme.

In one or more embodiments of the invention, a cache (100) includes one or more blocks (block A (104), block N (106), block B (110), block M (112)). In one or more embodiments of the invention, a cache (100) is divided into sections of any size called blocks. For example, the blocks (block A (104), block N (106), block B (110), block M (112)) may all be equal in size. In one or more embodiments of the invention, a block (block A (104), block N (106), block B (110), block M (112)) acts as the minimum size granularity for a virtual partition (e.g., virtual partition A (102, virtual partition N (108))) (described below). In one or more embodiments of the invention, the number of blocks (block A (104), block N (106), block B (110), block M (112)) into which a cache (100) is divided is a multiple of two. One exemplary non-limiting way by which a cache may be divided into blocks is to designate as a block all cache lines that are associated with memory addresses that include a certain sequence of bits. For example, blocks in a cache that is to be divided into eight blocks may be identified using the three least significant bits of the set bits of a memory address. In such an example, all memory addresses with "000" as the three least significant bits of the set bits of the memory address are associated with a first block and all memory addresses with "001" as the three least significant bits of the set bits of the memory address are associated with a second block. Similarly, in such an example, all memory addresses that include "010", "011", "100", "101", "110", or "111", respectively, are associated with corresponding blocks, for a total of eight equal sized blocks.

In one or more embodiments of the invention, the cache (100) includes one or more virtual partitions (e.g., virtual partition A (102), virtual partition N (108)). In one or more embodiments of the invention, a virtual partition (e.g., virtual partition A (102), virtual partition N (108)) is a portion of the cache lines of a cache (100). In one or more embodiments of the invention, a virtual partition (e.g., virtual partition A (102), virtual partition N (108)) includes one or more blocks (described above) of cache lines in a cache. In one or more embodiments of the invention, a virtual partition includes an exact number (e.g., integer) of available blocks (e.g., "1" block or "4" blocks rather than "2.7" blocks or "5.1" blocks). Virtual partitions (e.g., virtual partition A (102), virtual partition N (108)) of a cache may include all blocks (e.g., block A (104), block N (106), block B (110), block M (112)) of a cache, or any portion thereof. A virtual partition (e.g., virtual partition A (102), virtual partition N (108)) may be designated for use with one or more data structures used by a computing device. The data structures may be associated with a specific region of memory (e.g., a memory range). In one or more embodiments of the invention, memory locations outside the specified one or more data structures may not access the virtual partition designated for the data structure(s). A cache (100) may be divided into any number of virtual partitions (e.g., virtual partition A (102), virtual partition N (108)). In one or more embodiments of the invention, at least one virtual partition of a cache is a default partition which is associated with all memory, or a portion thereof, that is not within the one or more data structures associated with any non-default virtual partition of the cache.

In one or more embodiments of the invention, the cache is operatively connected to an address remapping device (114). In one or more embodiments of the invention, the address remapping device (114) is any combination of hardware (e.g., circuitry), software, and/or firmware that includes functionality to store a virtual partition table (discussed below in the description of the virtual partition table (116)), perform comparisons relating to memory addresses (discussed below in the description of the address comparison module (118)), and rewrite memory addresses (discussed below in the description of the address rewrite module (120)). For example, the address remapping device may include hardware implementing one or more modules to perform at least some of the functionality of the address remapping device. In such an example, hardware may perform all necessary operations, or, in other embodiments of the invention, software and/or firmware may work in conjunction with the various hardware modules in order to perform at least some of the functionality of the invention.

In one or more embodiments of the invention, the address remapping device (114) includes a virtual partition table (116). In one or more embodiments of the invention, a virtual partition table is any data construct capable of storing information related to virtual partitions (e.g., virtual partition A (102), virtual partition N (108)). The virtual partition table (116) may be implemented in hardware, software, firmware, and/or any combination thereof available on and/or accessible by the address remapping device. The virtual partition table (116) may include, but is not limited to, information such as the memory address at which one or more data structures to be mapped start (e.g., a memory address start value), the size of one or more data structures, the block at which one or more virtual partitions corresponding to the data structures begin (e.g., a virtual partition start-block value), the size, in blocks, of each virtual partition of the cache, including the default virtual partition, and/or a bit mask (e.g., one subtracted from the size in blocks, represented in binary, of the virtual partitions).

In one or more embodiments of the invention, the address remapping device (114) includes an address comparison module (118). In one or more embodiments of the invention, the address comparison module (118) is any hardware, software, firmware, and/or any combination thereof that includes functionality to compare a memory address with one or more memory address ranges (e.g., memory address ranges defined by a memory address start value of a data structure and the size of the data structure) to determine if the memory address falls within any of the one or more memory address ranges. For example, the address comparison module (118) may include one or more comparators for use in determining whether or not a received memory address falls within any memory address range in the virtual partition table (116). In one or more embodiments of the invention, if the memory address falls within a memory address range in the virtual partition table (116), then the memory address is associated with a data structure for which a virtual partition (e.g., virtual partition A (102), virtual partition N (108)) has been designated, and thus the memory address and its associated contents are associated with the virtual partition corresponding to the memory address range.

In one or more embodiments of the invention, the address remapping device (114) includes an address rewrite module (120). In one or more embodiments of the invention, the address rewrite module is any hardware, software, firmware, and/or any combination thereof that includes functionality to modify at least a portion of a memory address. For example, the address rewrite module may include a variety of hardware circuit elements configured to perform various operations in order to rewrite a memory address.

In one or more embodiments of the invention, the cache (100) is operatively connected to an address reconstruction device (122). An address reconstruction device (122) is any hardware, software, firmware, and/or any combination thereof that includes functionality to reconstruct, for an evicted cache line, a memory address that was previously remapped by an address remapping device (e.g., address remapping device (114)). For example, when an evicted cache line is to be written to memory, the address remapping unit may be a circuitry that replaces the rewritten portion of the set bits of a memory address with a copy of the original portion of the set bits by a simple routing of wires.

In one or more embodiments of the invention, the address reconstruction device (122) includes a dirty cache line detection module (124). A dirty cache line may be a cache line which has been modified while in the cache, but which has not yet been written back (along with the modifications) to memory. A dirty cache line detection module (124) is any hardware, software, firmware, and/or any combination thereof that includes functionality to determine that an evicted cache line received at the address reconstruction device (122) is a dirty cache line. For example, the dirty cache line detection module (124) may include functionality to determine whether or not a bit is set in the cache line indicating that the data has been modified.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, there may be more than one cache. Accordingly, embodiments of the invention should not be considered limited to the specific arrangements of modules and elements shown in FIG. 1.

Figure 2:
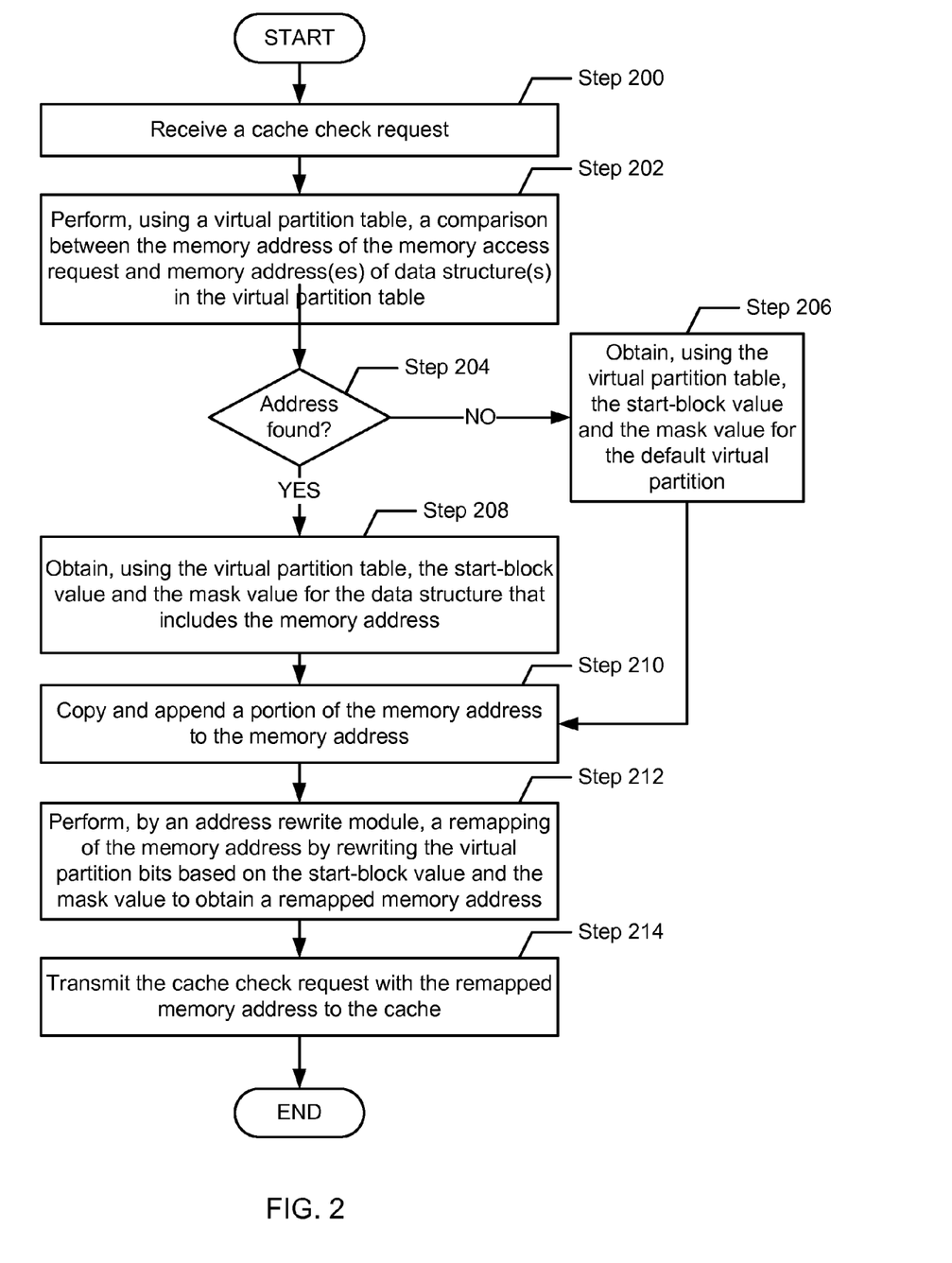
FIGS. 2 and 3 show flowcharts in accordance with one or more embodiments of the invention.

FIG. 2 shows a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a computer processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for memory address remapping in accordance with one or more embodiments of the invention. In Step 200, a cache check request is received from a computer processor at an address remapping device. A cache check request may occur when a computer processor requires access to the contents (e.g., data, instruction, etc.) of a given memory location, and checks to see if the contents of the desired memory location are in the cache (i.e., a cache hit) or if the contents must be retrieved from main memory and/or elsewhere (i.e., a cache miss). In one or more embodiments of the invention, the cache check request includes a memory address (e.g., the memory address of the memory location whose contents the computer processor seeks to access).

In Step 202, an address comparison module of the address remapping device performs a comparison using the memory address received in Step 202 and a virtual partition table. For example, the virtual partition table may include a starting memory address and a size, in bytes, of one or more data structures that are associated with a virtual partition, which define a memory address range corresponding to the data structure. In such an example, the address comparison module may perform a comparison using comparators to determine if the memory address falls within any memory address range associated with any data structure in the virtual partition table.

In Step 204, a determination based on the comparison of Step 202 is made as to whether the memory address was found to fall within any memory address range associated with a data structure in the virtual partition table. If the memory address was found to not be within any memory range in the virtual partition table, the process proceeds to Step 206. If, on the other hand, the memory address is found to fall within a memory range associated with a data structure in the virtual partition table, the process proceeds to Step 208.

In Step 206, a start block value and a mask value associated with a virtual partition are obtained using the virtual partition table. In one or more embodiments of the invention, because the memory address was determined in Step 204 to fall outside of any memory address range in the virtual partition table associated with a data structure, the cache check request is serviced using the default virtual partition. To that end, in one or more embodiments of the invention, a start-block value and a mask value (e.g., a virtual partition mask value) associated with the default partition are obtained from the virtual partition table. In one or more embodiments of the invention, the start-block value corresponding to the default virtual partition is a number associated with the first block of the default virtual partition. For example, if there are eight blocks in a cache numbered zero through seven, and the default virtual partition includes the last two blocks, then the start-block value associated with the default virtual partition is six. In one or more embodiments of the invention, a mask is one or more bits. The mask bits may be represented as a binary number. For example, if the number of blocks in a cache is eight, numbered zero through seven, then the number of bits in the mask may be three (e.g., the log (base 2) value of the number of blocks (8)=3). In such an example, the mask value in the virtual partition table is determined by taking the size, in blocks, of a virtual partition and subtracting one. Continuing the aforementioned example, if the number of blocks in a virtual partition is four, then the mask value is three, which is represented as the three bit binary number 011. After obtaining the start-block value and mask value for the default virtual partition, the process proceeds to Step 210.

Turning to Step 208, a start block value and a mask value (e.g., the value of a virtual partition mask) associated with a virtual partition are obtained using the virtual partition table. In one or more embodiments of the invention, the virtual partition is associated with the data structure whose memory address range was the memory address range in which the memory address of the cache check request fell. The start-block value may correspond to the first block of the virtual partition and the mask value, which is included in the virtual partition table, may have been calculated in the same manner as described above in reference to the mask value corresponding to the default virtual partition.

In Step 210, a portion of the memory address is copied and appended to the memory address. For example, in an N-way set associative cache, a portion of the set bits may be appended to the tag bits. In one or more embodiments of the invention, the bits of the portion of the memory address that is copied and appended are referred to as virtual partition bits because they are used to identify one or more blocks that are included in a virtual partition. As an example, if there are eight blocks in a cache, three bits (i.e., bits representing zero through seven) may be required to identify a block. In such an example, the three least significant bits of the set bit portion of the memory address may be copied and appended to the most significant bits of the tag bit portion of the memory address. Appending the copied portion of the memory address to the memory address may result in a memory address that is wider by the number of bits appended.

In Step 212, an address rewrite module rewrites the portion of the memory address that was copied and appended in Step 210. In one or more embodiments of the invention, the mask value obtained in either step 206 (i.e., the mask value for the default partition) or Step 208 (i.e., the mask value associated with the virtual partition to which the data structure is associated) is used to perform a bitwise AND operation on the portion of the set bits copied and appended in Step 210 in order to obtain masked virtual partition bits. For example, if the mask was determined to be 011 (i.e., three), and the portion of the memory address is 101 (i.e., five), then a bitwise AND operation of the two values yields 001 (i.e., one). In one or more embodiments of the invention, the value resulting from the bitwise AND operation is then added to the start-block value obtained in either Step 208 or Step 208. Continuing the previous example, if the value resulting from the bitwise AND operation is 001, and the start-block value is one (represented in binary as 001), then adding the two values together yields 010 (i.e., one+one=two). Once the addition is complete, the virtual partition bits become rewritten virtual partition bits. In one or more embodiments of the invention, the memory address with the appended virtual partition bits and the rewritten virtual partition bits is called a remapped memory address.

In Step 214, the cache check request, including the remapped memory address, is transmitted to the cache. In one or more embodiments of the invention, once the cache receives the remapped memory address, the rewritten portion of the memory address cause any memory address within a memory address range associated with a data structure in the virtual partition table to be mapped to one of the blocks of the virtual partition associated with the data structure. In one or more embodiments of the invention, if the memory address did not fall within any memory address range associated with a data structure in the virtual partition table, then the rewritten portion of the memory address cause the remapped memory address to correspond to one of the blocks in the default virtual partition.

Figure 3:
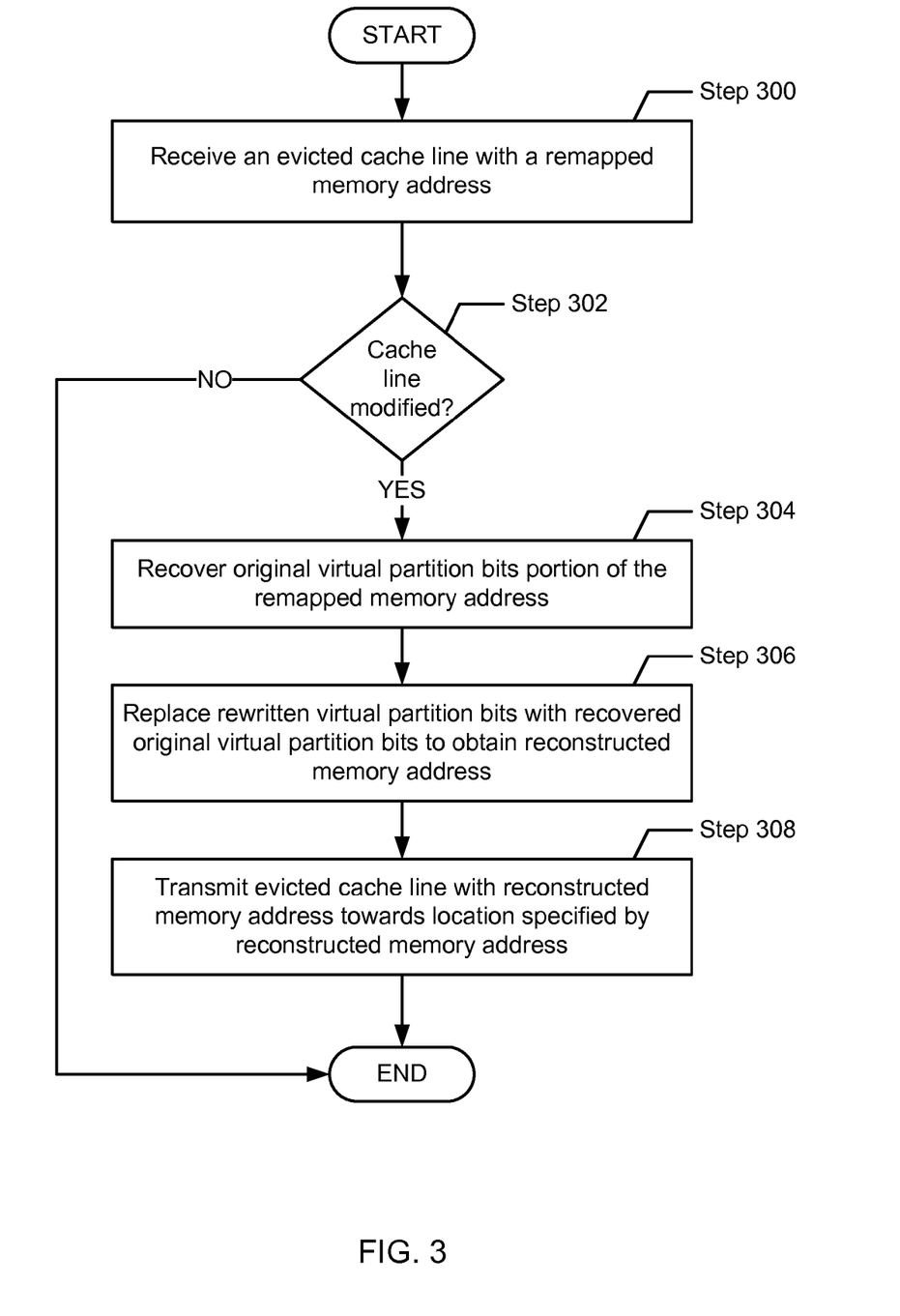

FIG. 3 shows a flowchart describing a method for reconstructing a previously remapped memory address to obtain a reconstructed memory address in the event that a dirty cache line is evicted from the cache in accordance with one or more embodiments of the invention. In Step 300, a cache line with a remapped memory address that has been evicted from a cache is received by an address reconstruction device. The remapped memory address, as described above, may include appended virtual partition bits and rewritten virtual partition bits.

In Step 302, a determination is made as to whether or not the evicted cache line is a dirty cache line. In one or more embodiments of the invention, a dirty cache line is a cache line whose contents have been modified while in the cache such that the contents of the cache line no longer match the contents of the memory location that was stored in the cache line. In one or more embodiments of the invention, the cache line may include, along with the cache line contents and the remapped memory address, one or more control bits (e.g., flags) that indicate whether a cache line is dirty. For example, the cache line may include a valid bit which, if not set, indicates that the cache line is dirty. In such an example, the determination as to whether a received cache line is dirty is made via checking whether or not the valid bit is set (e.g., one) or not (e.g., zero). If the cache line is not a dirty cache line, the process proceeds to end. If the cache line is a dirty cache line, the process proceeds to Step 304.

In Step 304, the virtual partition bits which were copied and appended to the memory address in Step 210 of FIG. 2 are recovered. In one or more embodiments of the invention, the virtual partition bits are recovered from whatever location to which the virtual partition bits were appended. For example, if there were three virtual partition bits appended to the most significant bits of the tag bits of the memory address, then the three virtual partition bits are recovered by reading the three bits in that location. In one or more embodiments of the invention, once recovered, the appended virtual partition bits may be dropped from being a part of the memory address such that the memory address returns to its original width, in bits.

In Step 306, the rewritten virtual partition bits are replaced by the recovered virtual partition bits. In one or more embodiments of the invention, the recovered virtual partition bits are used to rewrite the rewritten virtual partition bits so that the result is a reconstructed memory address that is equivalent to the memory address received as a part of the cache check request in Step 200 of FIG. 2. As an example, of the original virtual partition bits were 101, the rewritten virtual partition bits were 010, and the original virtual partition bits were appended to the tag bits, then circuitry that uses wires to route the recovered virtual partition bits into the place of the rewritten virtual partition bits may be used to obtain the reconstructed memory address.

In Step 308, the evicted cache line along with the reconstructed memory address are transmitted towards the memory location identified by the reconstructed memory address.

One of ordinary skill in the art and having the benefit of this disclosure will understand that, although the preceding description of FIGS. 2 and 3 is described using examples with reference to set bits (and thus to an N-way set associative cache), one or more embodiments of the invention include functionality to perform similar Steps in relation to any cache addressing scheme. For example, in a direct mapped cache, the virtual partition bits may be a portion of the line bits. As another example, in a fully associative cache, the virtual partition bits may be a portion of the tag bits. Additionally, through specific locations within the set bits are used in examples in the preceding description of FIG. 2 to describe where the virtual partition bits are found and to where they are appended, one of ordinary skill in the art and having the benefit of this disclosure will appreciate that the virtual partition bits may be any portion of any segment of a memory address used to associate a cache location (e.g., set, line, etc.) with one or more memory addresses and may be appended to any portion of the memory address consistent with the invention.

Figure 4A:
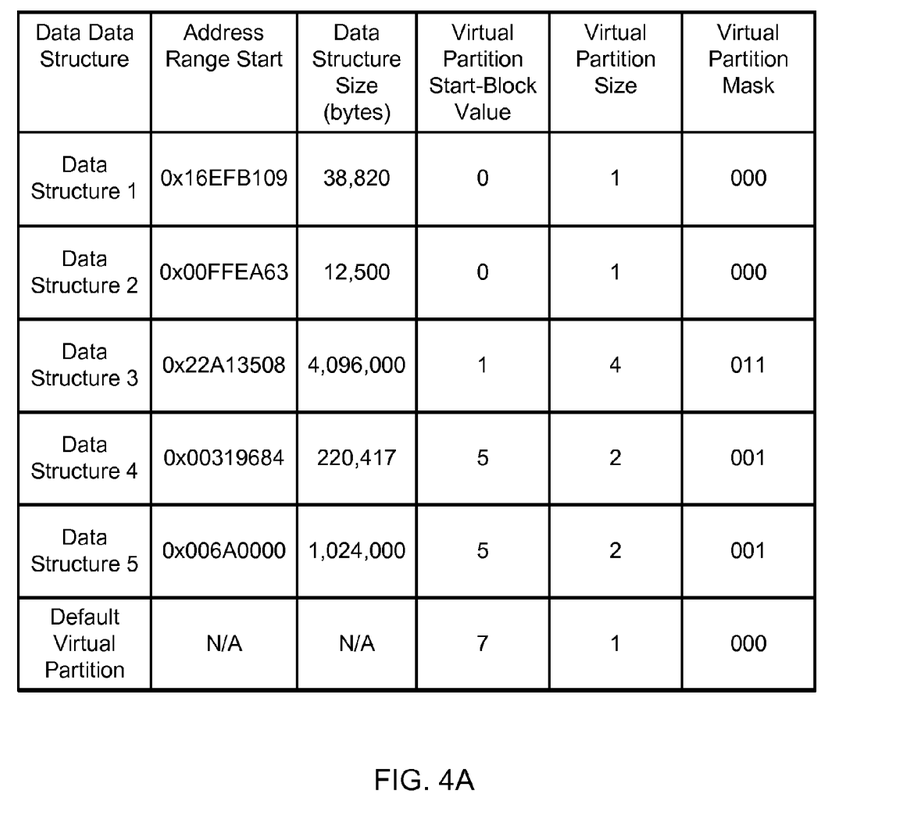
FIGS. 4A-4C show an example in accordance with one or more embodiments of the invention.
Figure 4B:
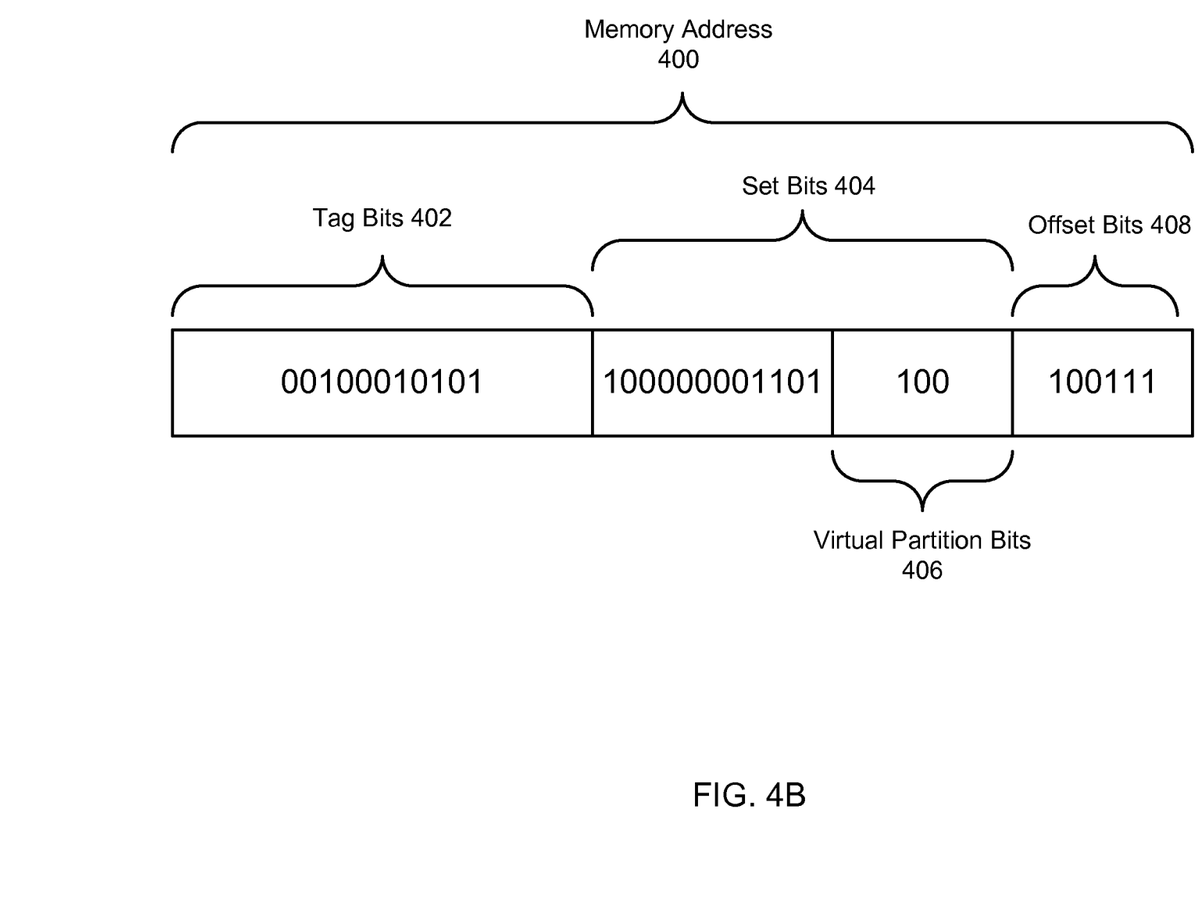
Figure 4C:
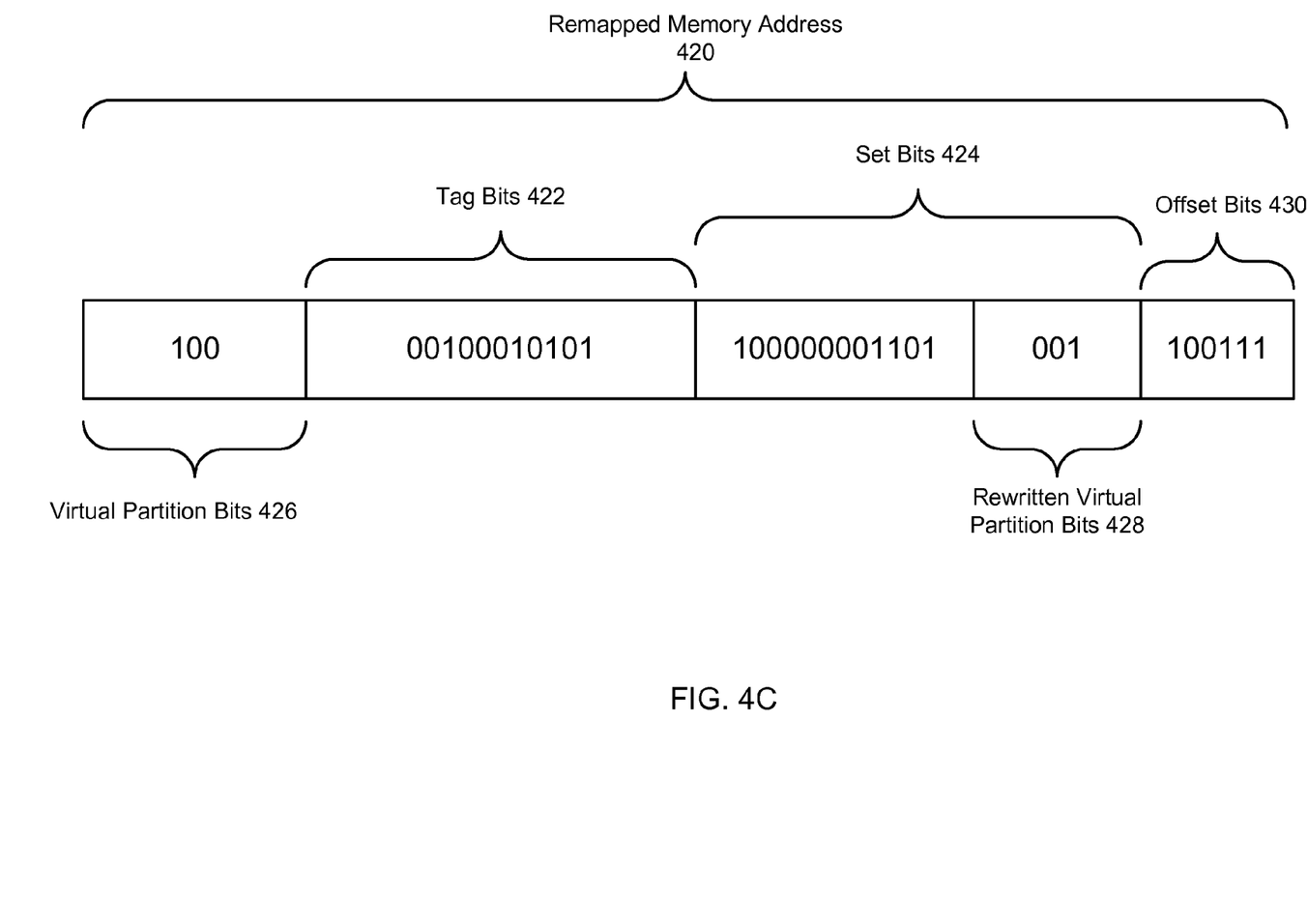

FIGS. 4A-4C show an example in accordance with one or more embodiments of the invention. The following example is for explanatory purposes only and not intended to limit the scope of the invention.

Referring to FIGS. 4A-4C, consider a scenario in which a four-way set associative eight megabyte (MB) cache is partitioned into eight blocks, numbered one through seven. The cache is associated with a computer processor of a computing device and is operatively connected to an address remapping device and an address reconstruction device (e.g., as shown in FIG. 1). In such a scenario, there are five data structures in the main memory of the computing device that are each designated to be associated with a virtual partition of the cache. The cache includes 131,072 sixty-four byte cache lines (i.e., 8 MB/64) divided into 32,768 sets (i.e., 131,072/4) of four cache lines each.

The address remapping device includes a virtual partition table, shown in FIG. 4A that includes an entry for each data structure associated with a virtual partition and a default partition. The address range start column includes the thirty-two bit memory address value for each data structure at which the data structure begins. For example, Data Structure 1 starts at a thirty-two bit memory address, written in hexadecimal, of 0x16EFB109. The Address Range Start value is not applicable to the Default Virtual Partition as it is not associated with a particular data structure. The Data Size value represents the number of bytes of memory in which the data structure resides. For example, Data Structure 3 is 4,096,000 bytes. The Virtual Partition Start-Block Value column includes a block number for each data structure, and the default virtual partition, at which the virtual partition associated with a data structure, or the Default Virtual Partition, begin. For example, the virtual partition associated with Data Structure 3 starts at block one. The Virtual Partition Size column includes the size, in blocks, of the virtual partition associated with each of the data structures as well as the default virtual partition. The Virtual Partition Mask column includes a mask value for the virtual partition associated with each data structure and the default virtual partition table. In one or more embodiments of the invention, the mask value is calculated by subtracting one from the Virtual Partition Size. Therefore, for example, because the Default Virtual Partition is one block in size, the mask value for the Default Virtual Partition is zero.

In this example, there are four virtual partitions in the cache. Data Structure 1 and Data Structure 2 are associated with the first virtual partition, as may be ascertained, at least, by the fact that the start-block value is the same for both data structures. The size of the virtual partition associated with Data Structure 1 and Data Structure 2 is one block. The second virtual partition is associated with Data Structure 3, starts at block one, and is four blocks in size. The third virtual partition is associated with both Data Structure 4 and Data Structure 5, starts at block five, and is two blocks in size. The fourth virtual partition is the Default Virtual Partition, starts at block seven, and is one block in size.

FIG. 4B shows a thirty-two bit memory address (400) 0x22b01927 represented in binary (i.e., 0010 0010 1011 0000 0001 1011 0010 0111). With sixty-four byte cache lines, the offset bits (408) of the memory address (400) include the six least significant bits (i.e., 2^6=64) of the memory address (i.e., 100111). With 32,768 sets, the set bits (404) include the next fifteen least significant bits of the memory address (i.e., 100000001101100). The three least significant bits of the set bits (i.e., 100) are the virtual partition bits (406). The remaining eleven most significant bits of the memory address (i.e., 00100010101) are the tag bits (402).

Continuing the example, consider a scenario in which a cache check request is sent towards the cache by a computer processor with which the cache is associated that seeks to perform a write operation on the memory contents identified by the memory address shown in FIG. 4B. In such a scenario the cache check request, including the memory address shown in FIG. 4B, is first received by an address remapping device. (e.g., address remapping device (114) of FIG. 1). An address comparison module (e.g., address comparison module (118) of FIG. 1) of the address remapping device performs a comparison (e.g., using circuitry including comparators) to determine if the memory address falls within any memory address range stored in the virtual partition table shown in FIG. 4A. Looking again at the virtual partition table in FIG. 4A, Data Structure 3 is associated with a four-block virtual partition. Data Structure 3 starts at memory address 0x22a13508 and is 4,096,000 bytes in size, therefore the memory address range corresponding to Data Structure 3 is 0x22a13508 through 0x22dfb508. Accordingly, the address comparison module determines that the received memory address 0x22b01927 falls within the memory address range corresponding to Data Structure 3.

Next, an address rewrite module (e.g., address rewrite module (120) of FIG. 1) of the address remapping device obtains a start-block value (i.e., 1 or 001 in binary) and a mask value (e.g., 3 or 011 in binary) corresponding to Data Structure 3 using the virtual partition table shown in FIG. 4A. The address rewrite module then copies the virtual partition bits (406) and appends them to the most significant bits of the tag bits (402). The address rewrite module then performs a bitwise AND operation on the virtual partition bits and the mask value (i.e., 100 & 011=000) and adds the start-block value to the result (i.e., 000+001=001) to obtain rewritten virtual partition bits. Thus, if the virtual partition bits are B, the rewritten virtual partition bits are B', the mask value is M, and the start-block value is S, an equation representing the process of obtaining the rewritten virtual partition bits might be:

$$B'=(B \& M)+S.$$

As additional explanation of the equation, note that the mask value used in this example (i.e., 011), when used in an AND operation with any three-digit binary number, will yield either 000, 001, 010, or 011. When added to the start-block value, which in this example is 001, the results yield 001, 010, 011, or 100, respectively. The values 001, 010, 011, and 100 (e.g., 1, 2, 3, and 4 in decimal notation) represent the four blocks that are included in the virtual partition associated with Data Structure 3, and thus application, by the address rewrite module, of the equation to the virtual partition bits (406) always yields one of these four values. Accordingly, every set in the cache identified by set bits that end in one of the four values are the sets that make up the virtual partition associated with Data Structure 3.

FIG. 4C shows the remapped memory address (420), including the appended virtual partition bits (426), the tag bits (422), the offset (830), and the set bits (424), which now include the rewritten virtual partition bits (428). The tag bits (422) and the offset bits (430) remain the same as shown in the memory address seen in FIG. 4B.

After the memory address of FIG. 4B is remapped, using the information in the virtual partition table shown in FIG. 4A, to obtain the remapped memory address of FIG. 4C, the remapped memory address (420), which is now thirty-five bits, is passed to the cache and used to perform the cache check request. To check the cache, the set bits (424) (including the rewritten virtual partition bits (428)) are used to find the set within the cache, which is a set in one of the blocks included in the virtual partition corresponding to Data Structure 3. Next, the tag bits (422) are used to determine if the contents of the memory location identified by the memory address shown (400) in FIG. 4B exist in the cache. Within the set identified by the set bits (424) including the rewritten virtual partition bits (428) (i.e., 100000001101001), the tag bits (422) (i.e., 001000010101) are found to be in one of the four cache lines in the set, and thus a cache hit has occurred. The offset bits (430) (i.e., 100111 or 39 in decimal notation) are then used to determine the offset (i.e., the thirty-ninth byte) within the sixty-four byte data in the cache line at which the requested contents reside. The thirty-ninth byte, which includes the memory contents corresponding to the memory address shown in FIG. 4B, are therefore returned to the computer processor that issued the cache check request, which performs the desired write operation.

In the event that the address reconstruction device receives a cache check request that includes a memory address that does not fall within any memory address range associated with a data structure in the virtual partition table of FIG. 4A, then the address rewrite module will use the mask value (i.e., 0) and the start-block value (i.e., 7) corresponding to the Default Virtual Partition in order to map the cache check request to the block included in the virtual partition that is designated to be the Default Virtual Partition.

In the event that any cache line is evicted from the cache, the cache line, along with a remapped memory address, is first sent to an address reconstruction device. Using the example of the remapped memory address (420) shown in FIG. 4C, a dirty cache line detection module (e.g., dirty cache line detection module (124) of FIG. 1) first determines if the evicted cache line is dirty (i.e., the contents of one or more bytes of the cache line have been modified). If the cache line is not dirty, then the cache line is discarded because there is no need to write the contents back into memory. If, however, the cache line is dirty, as is true in the present example because the computer processor performed a write operation on the contents of the thirty-ninth byte of the cache line, then the address reconstruction device reconstructs the memory address (e.g., memory address (400) of FIG. 4B) using the remapped memory address (e.g., remapped memory address (420) of FIG. 4C). The reconstruction simply replaces the rewritten virtual partition bits (428) with the appended virtual partition bits (426) to obtain the original memory address (e.g., memory address (400) of FIG. 4B) and then the cache line is written back to the sixty-four memory locations that begin with the tag bits (402) followed by the set bits (404).

Figure 5:
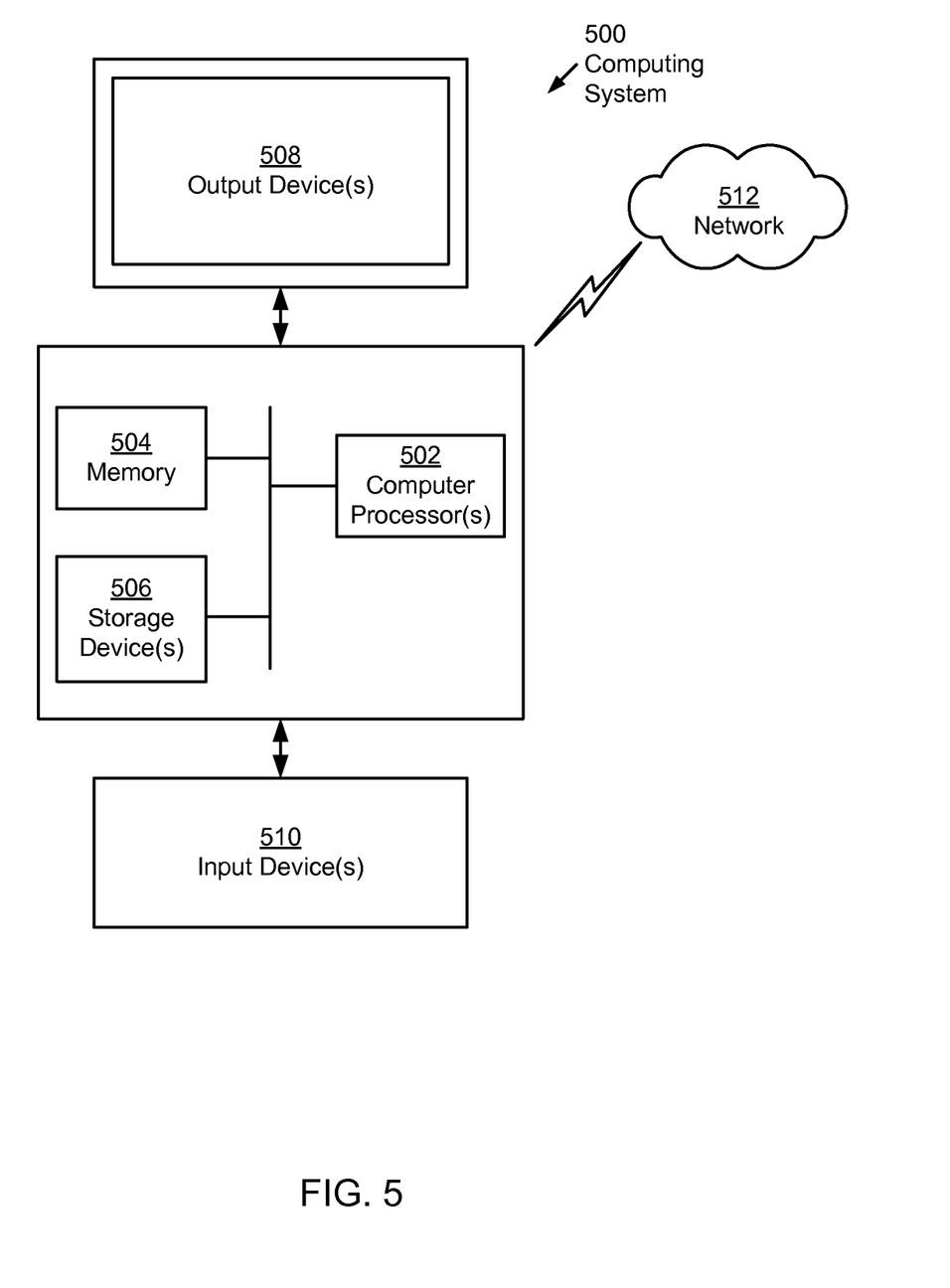
FIG. 5 shows a computing system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One of ordinary skill in the art and having the benefit of this disclosure will comprehend that the functionality of a computer may be altered by the invention. Specifically, the invention provides to a computing device a system and method by which the operation of cache associated with one or more computer processors is modified in order to provide certain data structures with a higher quality of service in regards to the cache. More specifically, the invention divides a cache into virtual partitions, which are associated with the data structures, which may result in a higher rate of cache hits for a computer processor working with the data structure that would exist without the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing a virtual partition of a cache to a data structure comprising:
receiving, at an address remapping device, a cache check request comprising a memory address comprising a plurality of bits;
identifying, using a virtual partition table, the virtual partition by determining that the memory address falls within a data structure memory address range of a plurality of data structure memory address ranges;
obtaining a copy of a plurality of virtual partition bits comprising a portion of the plurality of bits;
appending the copy of the plurality of virtual partition bits to the memory address;
rewriting the plurality of virtual partition bits to obtain a plurality of rewritten virtual partition bits corresponding to the virtual partition;
generating a remapped memory address by replacing the plurality of virtual partition bits with the plurality of rewritten virtual partition bits, wherein the remapped memory address comprises the copy of the plurality of virtual partition bits and the plurality of rewritten virtual partition bits; and
transmitting a remapped cache check request comprising the remapped memory address to the cache.

2. The method of claim 1, further comprising:
obtaining, based on the virtual partition and using the virtual partition table, a virtual partition start-block value and a virtual partition mask value,
wherein rewriting the plurality of virtual partition bits to obtain the plurality of rewritten virtual partition bits comprises:
performing an AND operation on the plurality of virtual partition bits and the virtual partition mask value to obtain a plurality of masked virtual partition bits; and
adding the plurality of masked virtual partition bits to the virtual partition start-block value.

3. The method of claim 2, wherein the virtual partition mask value is equal to a size of the virtual partition, in blocks, minus one.

4. The method of claim 1, wherein the cache is an N-way set associative cache and the plurality of bits of the memory address comprise a plurality of tag bits and a plurality of set bits, and wherein the plurality of virtual partition bits comprise a portion of the plurality of set bits.

5. The method of claim 4, wherein generating the remapped memory address further comprises appending the plurality of virtual partition bits to the plurality of tag bits before rewriting the plurality of virtual partition bits to obtain the plurality of rewritten virtual partition bits.

6. The method of claim 4, further comprising:
receiving, at an address reconstruction device, an evicted cache line comprising the remapped memory address;
determining that the evicted cache line is a dirty cache line;
obtaining, based on the determination, the plurality of virtual partition bits that were appended to the memory address;
replacing the plurality of rewritten virtual partition bits of the remapped memory address with the plurality of virtual partition bits to obtain a reconstructed memory address; and
transmitting a reconstructed evicted cache line towards a memory location identified by the reconstructed memory address.

7. The method of claim 1, further comprising:
receiving, at the address remapping device, a second cache check request comprising a second memory address comprising a second plurality of bits;
determining, using the virtual partition table, that the second memory address does not fall within any of the plurality of data structure memory address ranges
identifying, based on the determination, a default virtual partition;
obtaining a second copy of a second plurality of virtual partition bits comprising a second portion of the second plurality bits;
appending the second copy of the second plurality of virtual partition bits to the second memory address;
rewriting the second plurality of virtual partition bits to obtain a second plurality of rewritten virtual partition bits corresponding to the default virtual partition;
generating a second remapped memory address by replacing the second plurality of virtual partition bits of the second memory address with the second plurality of rewritten virtual partition bits; and
transmitting a second remapped cache check request comprising the second remapped memory address to the cache.

8. The method of claim 1, wherein the cache is one selected from a group consisting of a direct mapped cache, a fully associative cache, and set associative cache.

9. A system for providing a virtual partition of a cache to a data structure comprising:
a computer processor;
the cache associated with the computer processor;
an address remapping device configured to:
receive a cache check request comprising a memory address comprising a plurality of bits;
identify, using a virtual partition table, the virtual partition by determining that the memory address falls within a data structure memory address range of a plurality of data structure memory address ranges;
obtain a copy of a plurality of virtual partition bits comprising a portion of the plurality of bits;
append the copy of the plurality of virtual partition bits to the memory address;
rewrite the plurality of virtual partition bits to obtain a plurality of rewritten virtual partition bits corresponding to the virtual partition;
generate a remapped memory address by replacing the plurality of virtual partition bits with the plurality of rewritten virtual partition bits, wherein the remapped memory address comprises the copy of the plurality of virtual partition bits and the plurality of rewritten virtual partition bits; and
transmit a remapped cache check request comprising the remapped memory address to the cache; and
an address reconstruction device configured to:
receive an evicted cache line comprising the remapped memory address;
determine that the evicted cache line is a dirty cache line;

obtain, based on the determination, the plurality of virtual partition bits that were appended to the memory address;

replace the plurality of rewritten virtual partition bits of the remapped memory address with the plurality of virtual partition bits to obtain a reconstructed memory address; and transmit a reconstructed evicted cache line towards a memory location identified by the reconstructed memory address.

10. The system of claim 9, wherein the address remapping device is further configured to:

obtain, based on the virtual partition and using the virtual partition table, a virtual partition start-block value and a virtual partition mask value; and rewrite, using the virtual partition start-block value and the virtual partition mask value, the plurality of virtual partition bits to obtain the plurality of rewritten virtual partition bits, wherein rewriting the plurality of virtual partition bits comprises:

performing an AND operation on the plurality of virtual partition bits and the virtual partition mask value to obtain a plurality of masked virtual partition bits; and adding the plurality of masked virtual partition bits to the virtual partition start-block value.

11. The system of claim 10, wherein the virtual partition mask value is equal to a size of the virtual partition, in blocks, minus one.

12. The system of claim 9, wherein the address remapping device is further configured to:

receive a second cache check request comprising a second memory address comprising a second plurality of bits;

determine, using the virtual partition table, that the second memory address does not fall within any of the plurality of data structure memory address ranges identify, based on the determination, a default virtual partition;

obtain a second plurality of virtual partition bits comprising a portion of the second plurality of bits;

rewrite the second plurality of virtual partition bits to obtain a second plurality of rewritten virtual partition bits corresponding to the default virtual partition;

generate a second remapped memory address by replacing the second virtual partition bits of the memory address with the second rewritten virtual partition bits; and transmit a second remapped cache check request comprising the second remapped memory address to the cache.

13. The system of claim 9, wherein the cache is one selected from a group consisting of a direct mapped cache, a fully associative cache, and set associative cache.

14. The system of claim 9, wherein the address remapping device is implemented using hardware comprising comparators.

15. The system of claim 9, wherein cache is an N-way set associative cache and the plurality of bits of the memory address comprise a plurality of tag bits and a plurality of set bits, and wherein the plurality of virtual partition bits comprise a portion of the plurality of set bits.

16. The system of claim 15, wherein generating the remapped memory address further comprises appending the plurality of virtual partition bits to the plurality of tag bits before rewriting the plurality of virtual partition bits to obtain the plurality of rewritten virtual partition bits.

17. A non-transitory computer readable medium comprising instructions for providing a virtual partition of a cache to a data structure which, when executed, cause a computer processor to:

receive, at an address remapping device, a cache check request comprising a memory address comprising a plurality of bits;

identify, using a virtual partition table, the virtual partition by determining that the memory address falls within a data structure memory address range of a plurality of data structure memory address ranges;

obtain a copy of a plurality of virtual partition bits comprising a portion of the plurality of bits;

append the copy of the plurality of virtual partition bits to the memory address;

rewrite the plurality of virtual partition bits to obtain a plurality of rewritten virtual partition bits corresponding to the virtual partition;

generate a remapped memory address by replacing the plurality of virtual partition bits with the plurality of rewritten virtual partition bits, wherein the remapped memory address comprises the copy of the plurality of virtual partition bits and the plurality of rewritten virtual partition bits; and transmit a remapped cache check request comprising the remapped memory address to the cache.

18. The non-transitory computer readable medium of claim 17, further comprising instructions which, when executed by the computer processor, cause the computer processor to:

obtain, based on the virtual partition and using the virtual partition table, a virtual partition start-block value and a virtual partition mask value; and wherein rewriting the plurality of virtual partition bits to obtain the plurality of rewritten virtual partition bits comprises:

performing an AND operation on the plurality of virtual partition bits and the virtual partition mask value to obtain a plurality of masked virtual partition bits; and adding the plurality of masked virtual partition bits to the virtual partition start-block value.

19. The non-transitory computer readable medium of claim 17, further comprising instructions which, when executed by the computer processor, cause the computer processor to:

receive, at an address reconstruction device, an evicted cache line comprising the remapped memory address;

determine that the evicted cache line is a dirty cache line;

obtain, based on the determination, the plurality of virtual partition bits that were appended to the memory address;

replace the plurality of rewritten virtual partition bits of the remapped memory address with the plurality of virtual partition bits to obtain a reconstructed memory address; and transmit a reconstructed evicted cache line towards a memory location identified by the reconstructed memory address.

20. The non-transitory computer readable medium of claim 17, further comprising instructions which, when executed by the computer processor, cause the computer processor to:

receive, at the address remapping device, a second cache check request comprising a second memory address comprising a second plurality of bits;

determine, using the virtual partition table, that the second memory address does not fall within any of the plurality of data structure memory address ranges identify, based on the determination, a default virtual partition;

obtain a second copy of a second plurality of virtual partition bits comprising a second portion of the second plurality bits;

append the second copy of the second plurality of virtual partition bits to the second memory address;

rewrite the second plurality of virtual partition bits to obtain a second plurality of rewritten virtual partition bits corresponding to the default virtual partition;

generate a second remapped memory address by replacing the second plurality of virtual partition bits of the second memory address with the second plurality of rewritten virtual partition bits; and transmit a second remapped cache check request comprising the second remapped memory address to the cache.

* * * * *